(12) United States Patent
Takada et al.

(10) Patent No.: US 7,993,892 B2
(45) Date of Patent: Aug. 9, 2011

(54) PRODUCTION OF ORGANIC/INORGANIC COMPOSITE HYDROGEL

(75) Inventors: Tetsuo Takada, Sakura (JP); Kazutoshi Haraguchi, Sakura (JP); Tooru Takehisa, Sakura (JP)

(73) Assignee: Kawamura Institute of Chemical Research, Sakura-shi (JP)

( * ) Notice: Subject to any disclaimer, the term of this patent is extended or adjusted under 35 U.S.C. 154(b) by 950 days.

(21) Appl. No.: 11/721,519

(22) PCT Filed: Dec. 13, 2005

(86) PCT No.: PCT/JP2005/022886
§ 371 (c)(1),
(2), (4) Date: Jun. 12, 2007

(87) PCT Pub. No.: WO2006/064810
PCT Pub. Date: Jun. 22, 2006

(65) Prior Publication Data
US 2009/0291500 A1      Nov. 26, 2009

(30) Foreign Application Priority Data

Dec. 14, 2004 (JP) ................. 2004-361220
Dec. 14, 2004 (JP) ................. 2004-361221
Apr. 8, 2005 (JP) ................. 2005-111914

(51) Int. Cl.
*C12N 11/14*  (2006.01)
*C12N 11/02*  (2006.01)
*C12N 11/08*  (2006.01)
*C12N 5/00*   (2006.01)

(52) U.S. Cl. ......... 435/176; 435/177; 435/180; 435/396

(58) Field of Classification Search .................. None
See application file for complete search history.

(56) References Cited

U.S. PATENT DOCUMENTS

| | | | |
|---|---|---|---|
| 4,352,916 A * | 10/1982 | Landoll | 526/200 |
| 4,876,289 A * | 10/1989 | Itoh et al. | 521/54 |
| 4,977,192 A | 12/1990 | Martineu et al. | |
| 5,102,775 A * | 4/1992 | Okuhara et al. | 430/287.1 |
| 5,837,421 A * | 11/1998 | Kanda et al. | 430/281.1 |
| 5,972,807 A * | 10/1999 | Tani et al. | 442/63 |
| 6,710,104 B2 * | 3/2004 | Haraguchi | 523/205 |
| 6,765,049 B2 | 7/2004 | Lorah et al. | |
| 6,943,206 B2 | 9/2005 | Haraguchi | |
| 7,365,120 B2 * | 4/2008 | Haraguchi et al. | 524/445 |
| 7,488,534 B2 * | 2/2009 | Koller et al. | 428/403 |

FOREIGN PATENT DOCUMENTS

| | | |
|---|---|---|
| EP | 0 291 422 A2 | 11/1988 |
| EP | 1 160 286 A1 | 12/2001 |
| JP | 2002-53629 A | 2/2002 |
| JP | 2002-053762 A | 2/2002 |
| JP | 2004-509984 A | 4/2004 |
| JP | 2004-143212 A | 5/2004 |
| JP | 2005-110604 A | 4/2005 |

OTHER PUBLICATIONS

European Search Report dated Feb. 3, 2009, issued in corresponding European Patent Application No. 05816726.3.
International Search Report of PCT/JP2005/022886, date of mailing, Apr. 18, 2006.

* cited by examiner

*Primary Examiner* — David Naff
(74) *Attorney, Agent, or Firm* — Westerman, Hattori, Daniels & Adrian, LLP

(57) ABSTRACT

The present invention provides a production process of an organic/inorganic composite hydrogel, which demonstrates superior mechanical properties, by uniformly dispersing a clay mineral in an organic polymer over a wide range of clay mineral content, and a dried form thereof, to be produced easily in a short period of time. The production process of an organic/inorganic composite hydrogel of the present invention comprises reacting a water-soluble organic monomer (a) in the presence of a water-swellable clay mineral (b) by irradiating with an energy beam in a solution in which a non-water-soluble polymerization initiator (d) is dispersed in an aqueous medium (c).

12 Claims, No Drawings

US 7,993,892 B2

PRODUCTION OF ORGANIC/INORGANIC COMPOSITE HYDROGEL

TECHNICAL FIELD

The present invention relates to a production process of an organic/inorganic composite hydrogel having a three-dimensional network structure comprising a polymer of a water-soluble organic monomer and a water-swellable clay mineral, a coated film of an organic/inorganic composite hydrogel and a cell culture substrate comprising that coated film, and a dried coated film of an organic/inorganic composite hydrogel and an antifogging coated film comprising that dried coated film.

BACKGROUND ART

Polymer composites referred to as nanocomposites have conventionally been prepared by compounding an organic polymer such as polyamide, polystyrene, polypropylene, polyimide or polyurethane with clay. Since the resulting polymer composite is finely dispersed in a clay layer having a large aspect ratio, the elastic modulus, heat deflection temperature, gas permeability, burning rate and so forth are known to be effectively improved.

An organic/inorganic composite hydrogel having a three-dimensional mesh structure composed of a polymer of a water-soluble acrylic monomer and a water-swellable clay mineral has been disclosed as an example of a nanocomposite material having particularly superior mechanical properties (see, for example, Japanese Unexamined Patent Application, First Publication No. 2002-053762 and Japanese Unexamined Patent Application, First Publication No. 2004-143212). Since this organic/inorganic composite hydrogel has superior mechanical properties not found in other gels, it is expected to be applied in various applications. In order to deploy the application thereof in various applications, the organic/inorganic composite hydrogel is frequently required to be formed into a coated film such as a thin film or film, formed into a pattern, or formed into a laminated structure, and in such cases, the composite hydrogel is easily molded into these shapes and forms by producing an organic/inorganic composite hydrogel using an energy beam.

As an example of a production process of the prior art, a process has been disclosed in which an acrylamide or acrylamide derivative and a (meth)acrylic acid ester and so forth are polymerized by heating or irradiation with ultraviolet light in the presence of a water-swellable clay mineral in an aqueous medium and an aqueous polymerization initiator (see, for example, Japanese Unexamined Patent Application, First Publication No. 2002-053762 and Japanese Unexamined Patent Application, First Publication No. 2004-143212). However, in the case of using a water-soluble peroxide for the polymerization initiator and carrying out the polymerization reaction by irradiating with ultraviolet light as in the process disclosed here, there were cases in which the mechanical properties of the resulting organic/inorganic composite hydrogel were not adequately obtained as well as cases in which elution of linear polymer occurred. In addition, since a water-soluble peroxide is used for the polymerization initiator, since the polymer composite is polymerized by allowing to stand undisturbed for several tens of minutes to more than ten hours at a constant temperature such as room temperature in the state in which oxygen in the polymer solution has been removed, there has been a need to simplify the production process as well as shorten the production time.

These problems occur particularly prominently when forming a coated film, thereby preventing the obtaining of an organic/inorganic composite hydrogel coated film having adequate mechanical properties and resulting in a desire to realize an organic/inorganic composite hydrogel coated film suitable for deployment in various applications.

DISCLOSURE OF THE INVENTION

Problems to be Solved by the Invention

An object of the present invention is to provide a production process of an organic/inorganic composite hydrogel having superior mechanical properties in a production process of an organic/inorganic composite hydrogel using an energy beam, and an antifogging coated film and cell culture substrate that use the resulting organic/inorganic composite hydrogel.

Means for Solving the Problems

As a result of conducting extensive studies to solve the aforementioned problems, the inventors of the present invention found that by dispersing a non-water-soluble polymerization initiator (d) in an aqueous medium (c) and reacting, in the resulting dispersion, a water-soluble monomer (a) by irradiating with an energy beam in the presence of a water-swellable clay mineral, the reaction is completed nearly instantaneously while being resistant to the effects of oxygen. Moreover, it was also found that by dispersing a non-water-soluble photopolymerization initiator (d) in the aqueous medium (c), the non-water-soluble photopolymerization initiator (d) is interposed around the water-swellable clay mineral (b) when the water-swellable clay mineral (b) is present in the dispersion. When the water-soluble organic monomer (a) is polymerized in such an environment, the polymerization reaction begins from the photopolymerization initiator interposed around the water-swellable clay mineral (b), bonding between a polymer of the water-soluble organic monomer (a) and the water-swellable clay mineral (b) proceeds favorably, and a three-dimensional network structure is formed in which the polymer of the water-soluble organic monomer (a) is crosslinked between the water-swellable clay mineral (b), thereby allowing the production of an organic/inorganic composite hydrogel having superior mechanical properties.

Namely, the present invention provides a production process of an organic/inorganic composite hydrogel having a three-dimensional network structure composed of a polymer of a water-soluble organic monomer (a) and a water-swellable clay mineral (b), wherein a non-water-soluble polymerization initiator (d) is dispersed in an aqueous medium (c), and the water-soluble organic monomer (a) is reacted in the resulting dispersion by irradiating with an energy beam in the presence of the water-swellable clay mineral (b).

In addition, the present invention provides a production process of a coated film comprising an organic/inorganic composite hydrogel having a three-dimensional network structure composed of a polymer of a water-soluble organic monomer (a) and a water-swellable clay mineral (b), wherein an energy beam-curable composition (X), containing a dispersion of a non-water-soluble polymerization initiator (d) dispersed in the water-soluble organic monomer (a), the water-swellable clay mineral (b) and an aqueous medium (c), is coated onto a substrate followed by irradiating with an energy beam.

In addition, the present invention provides a production process of a thin film comprising a dried organic/inorganic composite hydrogel having a three-dimensional network structure composed of a polymer of a water-soluble monomer (a) and a water-swellable clay mineral (b), wherein an energy beam-curable composition (X), containing a dispersion of a non-water-soluble polymerization initiator (d) dispersed in the water-soluble monomer (a), the water-swellable clay mineral (b) and an aqueous medium (c), is coated onto a substrate followed by irradiating with an energy beam to form an organic/inorganic composite hydrogel coated film, and removing the solvent from the organic/inorganic composite hydrogel coated film.

In addition, the present invention provides a culture substrate comprising an organic/inorganic composite hydrogel having a three-dimensional network structure composed of a polymer of a water-soluble organic monomer (a) and a water-swellable clay mineral (b).

In addition, the present invention provides an antifogging material comprising a dried organic/inorganic composite hydrogel having a three-dimensional network structure composed of a polymer of a water-soluble organic monomer (a) and a water-swellable clay mineral (b).

EFFECTS OF THE INVENTION

According to the production process of the present invention, since the production process is resistant to the effects of oxygen when polymerizing an organic/inorganic composite hydrogel, equipment and steps for removing oxygen are not required, thereby allowing the organic/inorganic composite hydrogel to be easily produced. Moreover, the organic/inorganic composite hydrogel can be produced in an extremely short period of time as a result of polymerizing by irradiating with an energy beam. In addition, as a result of having the characteristics of being resistant to the effects of oxygen on polymerization and polymerization being able to be completed in an extremely short period of time, the resulting organic/inorganic composite hydrogel and dried product thereof is able to realize superior mechanical properties and flexibility by uniformly dispersing the clay mineral in the organic polymer over a wide range of clay mineral content.

Since the organic/inorganic composite hydrogel and dried product thereof of the present invention exhibits superior mechanical properties and flexibility of the organic/inorganic composite hydrogel despite being a coated film by uniformly dispersing the clay mineral in an organic polymer over a wide range of clay mineral content, they are useful as materials for medical and nursing care devices as well as various types of industrial materials.

Since the culture substrate comprising the organic/inorganic composite hydrogel of the present invention has superior flexibility and toughness, it is able to stably transport cultured cells while retaining its shape even when transporting cultured cells along with the substrate. Moreover, in the case of carrying out co-culturing and so forth following initial cell culturing, culturing can be repeated without being contaminated by culture liquid or chemicals. In particular, since cell culture substrates in which hydrophilicity and hydrophobicity reversibly change according to the external environment exhibit superior adhesion with cells under hydrophobic conditions, they are able to effectively culture and grow cells, and since they are able to lower adhesion with cells under hydrophilic conditions, cell can be detached without using a protein hydrolase such as trypsin or chemicals, thereby enabling cells to be recovered easily without damaging cells or causing separation or contamination by the substrate.

Moreover, since the change from hydrophobicity to hydrophilicity or from hydrophilicity to hydrophobicity occurs rapidly, the effects on cells during changes in temperature and other parameters of the external environment are low.

Since the antifogging coated film comprising the dried organic/inorganic composite hydrogel of the present invention exhibits superior mechanical properties and antifogging properties by uniformly dispersing a clay mineral in an organic polymer over a wide range of clay mineral content while simultaneously having favorable adhesion with various types of substrates, it can be used as a material for medical and nursing care devices as well as various types of industrial materials.

BEST MODE FOR CARRYING OUT THE INVENTION

Organic/Inorganic Composite Hydrogel Production Process

The water-soluble organic monomer (a) used in the present invention has the property of dissolving in water, and together with interacting with the water-swellable clay mineral (b) capable of uniformly dispersing in water, is polymerized by being irradiated with radiation, and preferably has a functional group capable of forming a hydrogen bond, ionic bond, coordinate bond or covalent bond and so forth with a clay mineral. Specific examples of water-soluble organic monomers having a functional group include water-soluble organic monomers having an amide group, amino group, ester group, hydroxyl group, tetramethyl ammonium group, silanol group or epoxy group, with water-soluble organic monomers having an amide group being preferable. In addition, water as referred to in the present invention includes mixed solvents of organic solvents miscible with water having water as a main component thereof. In particular, water-soluble acrylic monomers are preferable, and the use of a water-soluble acrylic monomer allows the non-water-soluble initiator to be more finely and uniformly dispersed, and the obtaining of an organic/inorganic composite hydrogel having more superior properties and is resistant to the effects of oxygen during polymerization by an energy beam.

Preferable examples of such water-soluble organic monomers (a) that can be used include N-substituted acrylamide derivatives, N,N-disubstituted acrylamide derivatives, N-substituted methacrylamide derivatives and N,N-disubstituted methacrylamide derivatives, with specific examples including N-isopropyl acrylamide, N-isopropyl methacrylamide, N-n-propyl acrylamide, N-n-propyl methacrylamide, N-cyclopropyl acrylamide, N-cyclopropyl methacrylamide, N-ethoxyethyl acrylamide, N-ethoxyethyl methacrylamide, N-tetrahydrofurfuryl acrylamide, N-tetrahydrofurfuryl methacrylamide, N-ethyl acrylamide, N-ethyl-N-methyl acrylamide, N,N-diethyl acrylamide, N-methyl-N-n-propyl acrylamide, N-methyl-N-isopropyl acrylamide, N-acryloyl piperidine and N-acryloyl pyrrolidine.

The acrylic monomers of formulas (1) to (6) below are used even more preferably.

[Chemical Formula 1]

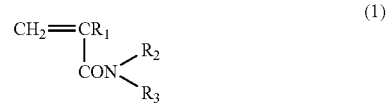

[Chemical Formula 2]

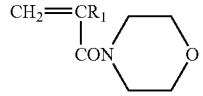

(2)

[Chemical Formula 3]

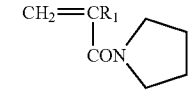

(3)

[Chemical Formula 4]

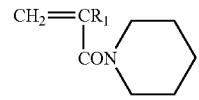

(4)

[Chemical Formula 5]

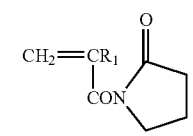

(5)

[Chemical Formula 6]

(6)

(wherein, $R_1$ represents a hydrogen atom or methyl group, $R_2$ and respectively and independently represent a hydrogen atom or alkyl group having 1 to 3 carbon atoms, $R_4$ represents an alkyl group having 1 to 2 carbon atoms, and n is 1 to 9).

One or more types of the aforementioned water-soluble organic monomers may be used as a mixture according to the required mechanical properties, chemical properties and so forth.

In addition, other copolymerizable monomers can also be used in combination to a degree that does not have an effect on the properties of the organic/inorganic composite hydrogel, examples of which include acrylic monomers having an anionic group such as a sulfone group or carboxyl group, acrylic monomers having a cationic group such as a quaternary ammonium group, acrylic monomers having amphoteric ionic groups such as a quaternary ammonium group and a phosphate group, acrylic monomers having amino acid residues such as a carboxyl group and an amino group, acrylic monomers having a sugar residue, acrylic monomers having a hydroxyl group, acrylic monomers having a polyethylene glycol or polypropylene glycol chain, amphipathic acrylic monomers having both a hydrophilic chain such as polyethylene glycol and a hydrophobic group such as a nonylphenyl group, polyethylene glycol diacrylate and N,N'-methylene bisacrylamide.

A polymer of the water-soluble organic monomer (a) in the present invention is able to form an organic/inorganic composite hydrogel of a stable form by forming a three-dimensional network structure with the water-swellable clay mineral (b), and acrylic compounds comprised of the previously listed monomers or vinyl compounds and so forth can be used. Examples of polymers of the water-soluble organic monomer (a) include poly(N-isopropylacrylainide), poly(N-n-propylacrylamide), poly(N-cyclopropylmethacrylamide), poly(N-isopropylmethacrylamide), poly(N-n-propylmethacrylamide), poly(N-ethoxyethylacrylamide), poly(N-ethoxyethylmethacrylamide), poly(N-tetrahydrofurfurylacrylamide), poly(N-tetrahydrofurfurylmethacrylamide), poly(N-ethylacrylamide), poly(N,N-diethylacrylamide), poly(N-acryloylpiperidine) and poly(N-acryloylpyrrolidine).

An example of the water-swellable clay mineral (b) used in the present invention is a swellable clay mineral capable of separating into a layered form, and is preferably a clay mineral capable of swelling and uniformly dispersing in water or a mixed solvent of water and an organic solvent, and particularly preferably an inorganic clay mineral capable of uniformly dispersing in a molecular form (single layer) or level close thereto in water. For example, water-swellable smectite or water-swellable mica can be used, specific examples of which include water-swellable hectorite, water-swellable montmorillonite, water-swellable saponite, and water-swellable synthetic mica, containing sodium as an interlayer ion. These clay minerals may also be used as a mixture.

When producing the organic/inorganic composite hydrogel of the present invention, the weight ratio (b)/(a) of the water-swellable clay mineral (b) to the water-soluble organic monomer (a) is preferably 0.01 to 10, more preferably 0.03 to 5, and particularly preferably 0.05 to 3. If the weight ratio (b)/(a) is less than 0.01, the mechanical properties of the resulting organic/inorganic composite hydrogel tend to be inadequate, while if the ratio exceeds 10, it becomes difficult to disperse the clay mineral.

There are no particular limitations on the aqueous medium (c) used in the present invention provided it is able to contain the water-soluble organic monomer (a) and the water-swellable clay mineral (b), and allows the obtaining of an organic/inorganic composite hydrogel having satisfactory mechanical properties as a result of polymerization by an energy beam. For example, it may be an aqueous solution containing water and a solvent and/or other compound miscible with water, and is able to contain, in particular, a preservative or antimicrobial, colorant, fragrance, enzyme, protein, sugars, amino acids, cells, DNA, salts, water-soluble organic solvent, surfactant or leveling agent.

Examples of the non-water-soluble polymerization initiator (d) used in the present invention include acetophenones such as p-tert-butyl trichloroacetophenone, benzophenones such as 4,4'-bisdimethylaminobenzophenone, ketones such as 2-methylthioxanthone, benzoin ethers such as benzoin methyl ether, α-hydroxyketones such as hydroxycyclohexyl phenyl ketone, phenyl glyoxylates such as methyl benzoyl formate, and metallocenes.

Non-water-soluble refers to the amount of the polymerization initiator that dissolves in water being 0.5% by weight or less. If solubility in water is excessively high, the mechanical properties of the resulting organic/inorganic composite hydrogel tend to be inadequate.

In the production process of the present invention, after dispersing the non-water-soluble polymerization initiator (d) in the aqueous medium (c), it is important to polymerize this dispersion in the presence of both the organic monomer (a) and the water-swellable clay mineral (b) in that dispersion by irradiating with an energy beam. At this time, the polymerization initiator (d) is preferably dispersed in the aqueous medium (c) dissolved in a solvent (e). As a result of employing this method, an organic/inorganic composite hydrogel having satisfactory mechanical properties can be obtained by irradiating with an energy beam. Conversely, in the case of using a water-soluble polymerization initiator, there are cases in which the mechanical properties of the resulting organic/inorganic composite hydrogel decrease or elution of linear polymer occurs.

A water-soluble solvent capable of dissolving the non-water-soluble polymerization initiator (d) or an acrylic monomer (e-1) that dissolves the non-water-soluble polymerization initiator (d) and has a hydrophile-lipophile balance (HLB) value of 8 or more can be used for the solvent (e) of the present invention. This HLB value is the value determined according to the Davis method ("Surfactants—Properties, Applications and Chemoecology", F. Kitahara, et al., ed., Kodansha Publishing, 1979, p. 24-27). Examples of the solvent (e) include polypropylene glycol diacrylates such as tripropylene glycol diacrylate; polyethylene glycol diacrylates, polypropylene glycol acrylates such as pentapropylene glycol acrylate; polyethylene glycol acrylates, methoxypolyethylene glycol acrylates such as methoxyethyl acrylate and methoxytriethylene glycol acrylate; nonylphenoxy polyethylene glycol acrylates, N-substituted acrylamides such as dimethyl acrylamide; hydroxyethyl acrylate and hydroxypropyl acrylate. If the HLB value of the acrylic monomer used for the solvent (e) is 8 or more, solubility or dispersivity in the aqueous medium (c) is superior, thereby making this preferable. One or more types of these acrylic monomers can be used as a mixture.

In addition, a water-soluble solvent (e2) capable of dissolving the non-water-soluble polymerization initiator (d) and having at least a certain degree of water solubility can be used for the solvent (e) of the present invention. A water-soluble solvent here preferably refers to a solvent of which 50 g or more is able to be dissolved in 100 g of water. If the solubility in water thereof is less than 50 g, the dispersivity of the non-water-soluble polymerization initiator (d) in the aqueous medium (c) decreases, thereby resulting in cases in which the mechanical properties of the resulting organic/inorganic composite hydrogel are low.

Examples of the water-soluble solvent (e2) include amides such as dimethylacetoamide and dimethylformamide; alcohols such as methanol and ethanol, tetrahydrofuran, and dimethylsulfoxide. These solvents may also be used as a mixture.

The weight ratio (d)/(e) of the non-water-soluble polymerization initiator (d) and the solvent (e) in a solution in which the polymerization initiator (d) is dissolved in the solvent (e) is preferably 0.001 to 0.1 and more preferably 0.01 to 0.05. If this ratio is 0.001 or more, since an adequate amount of radicals are generated by irradiation with an energy beam, the polymerization reaction is able to proceed favorably, and if the ratio if 0.1 or less, there is substantially no occurrence of discoloration or odor caused by the initiator, while also enabling costs to be reduced.

In addition, the dispersed amount of solution in which the polymerization initiator (d) is dissolved in the solvent (e) relative to the total weight of the water-soluble organic monomer (a), the water-swellable clay mineral (b), the aqueous solvent (c), polymerization initiator (d) and the organic solvent (e) is preferably 0.1 to 5% by weight and more preferably 0.2 to 2% by weight. If this dispersed amount is 0.1% by weight more, polymerization is adequately initiated, while if this amount is less than 5% by weight, problems such as the formation of linear polymers not involved in the organic/inorganic composite hydrogel, the generation of odor caused by an increase in the amount of polymerization initiator in the gel, and re-aggregation of the initially dispersed polymerization initiator or solution of the polymerization initiator and the solvent (e), can be reduced, thereby making this preferable since it allows the obtaining of a homogeneous organic/inorganic composite hydrogel.

In order to obtain an organic/inorganic composite hydrogel in the present invention having satisfactory mechanical properties, the solution in which the polymerization initiator (d) is dissolved in the solvent (e) is preferably dispersed in the aqueous medium (c) at 1 μm or less, particularly preferably at 0.1 μm or less, and most preferably at 0.01 μm or less. If dispersed at 1 μm or less, the reaction solution easily becomes homogeneous, thereby making this preferable since the homogeneity and transparency of the organic/inorganic composite hydrogel can be improved.

Examples of energy beams used in the present invention include an electron beam, gamma rays, X-rays, ultraviolet rays and visible light. In particular, ultraviolet rays are used preferably in consideration of the simplicity of the apparatus and ease of handling. The intensity of the irradiated ultraviolet rays is preferably 10 to 500 mW/cm$^2$, and the irradiation time is typically about 0.1 to 200 seconds. Although oxygen acts as an inhibitor of polymerization in the case of ordinary radical polymerization by heating, in the present invention, it is not necessary to prepare the solution and carry out polymerization by irradiation with an energy beam in an atmosphere isolated from oxygen, but rather these can be carried out in an air atmosphere. However, there are cases in which irradiating with ultraviolet rays in an inert gas atmosphere is desirable since it allows the polymerization rate to be further increased.

The production process of the inorganic/organic composite hydrogel of the present invention consists of shaping a reaction solution containing the water-soluble organic monomer (a), the water-swellable clay mineral (b), the aqueous medium (c), the polymerization initiator (d) and the solvent (e) into an arbitrary form (such as a plate, sheet, thin film, rod, sphere, fiber or hollow fiber) and irradiating with an energy beam to polymerize the water-soluble organic monomer (a). In addition, an organic/inorganic composite hydrogel can also be produced in the form of a single sheet or continuous sheets by using a belt-shaped support.

Examples of supports that can be used include metal, ceramic, glass, plastic, fabric, non-woven fabric, paper and wood. The sheet-like gel may ultimately be peeled from the support or it may used while still integrated with the support.

Moreover, an organic/inorganic composite hydrogel having an arbitrary pattern can also be produced if the aforementioned reaction solution is coated onto a support and then irradiated with an energy beam through a mask. An ultrafine pattern can be obtained on the micrometer level or lower.

In particular, the production process of the present invention is suitable for forming a coated film comprising an organic/inorganic composite hydrogel, and a coated film comprising an organic/inorganic composite hydrogel having superior mechanical properties can be easily produced by coating an energy beam-curable composition (X), containing a dispersion in which the non-water-soluble polymerization initiator (d) is dispersed in the water-soluble organic monomer (a), the water-swellable clay mineral (b) and the aqueous medium (c), onto a substrate followed by irradiating with an energy beam.

In addition, a coated film comprising a dried organic/inorganic composite hydrogel can be produced by producing the aforementioned coated film, washing as necessary, and removing the solvent by drying and so forth.

[Cell Culture Substrate]

The cell culture substrate of the present invention comprises an organic/inorganic composite hydrogel having a three-dimensional network structure composed of a polymer of the water-soluble organic monomer (a) and the water-swellable clay mineral (b), and preferably comprises the organic/inorganic composite hydrogel formed by irradiation with an energy beam.

The water-soluble organic monomer (a) and the water-swellable clay mineral (b) used here are the same as those previously described. A water-soluble organic monomer that imparts a polymer having both water solubility or hydrophilicity for absorbing water and hydrophobicity is particularly effective for the water-soluble organic monomer (a) since cultured cells can be easily separated from the resulting cell culture substrate. A water-soluble organic monomer that enables the hydrophilicity and hydrophobicity of the polymer in an aqueous solution to change with temperature, pH, solute concentration and solvent composition is used particularly preferably. More specifically, in the case of temperature, for example, polymers having a lower critical solution temperature (LCST) at which it becomes hydrophobic at or above the critical temperature (Tc), and polymers having an upper critical solution temperature (UCST) at which it becomes hydrophilic at or above the Tc are used preferably. In addition, in the case of solute concentration, for example, polymers that become hydrophobic at or above a certain concentration of sodium chloride in the solvent and become hydrophilic below that concentration at a certain temperature are also used preferably. Moreover, in the case of solvent composition, for example, polymers that become hydrophobic when the concentration of methanol relative to water in the solvent reaches a certain concentration, and become hydrophilic below that certain concentration at a certain temperature are also used preferably.

Since the organic/inorganic composite hydrogel used in the cell culture substrate of the present invention is such that the polymer of the water-swellable clay mineral (b) and the water-soluble organic monomer (a) has a three-dimensional network structure, it has the characteristic of allowing cells to retain their shape without being destroyed when detached from the organic/inorganic composite hydrogel following culturing. In addition, in the case it is necessary to transport the cells to the location of a subsequent experiment following culturing, the organic/inorganic composite hydrogel used in the cell culture substrate of the present invention enables the cells to be transported without destroying the cultured cell sheet. This organic/inorganic composite hydrogel is able to realize a tensile modulus of 1 kPa or more, tensile strength of 20 kPa or more, and fracture elongation of 50% or more at a moisture content of 90%, and a composite hydrogel having these properties can be used preferably. In addition, a tensile modulus of 5 kPa or more, tensile strength of 50 kPa or more and fracture elongation of 50% or more are more preferable, while a tensile modulus of 10 kPa or more, tensile strength of 80 kPa or more and fracture elongation of 100% or more are even more preferable. An organic/inorganic composite hydrogel having such mechanical properties allows the obtaining of a surface status suitable for cell culturing. In addition, an organic/inorganic composite hydrogel having such mechanical properties under conditions of a water content of 90% retains superior mechanical properties even in a state of exhibiting hydrophobicity during cell culturing, and demonstrates superior shape stability, handling, mobility and so forth regardless of its form following cell culturing.

This organic/inorganic composite hydrogel has hydrophilicity and hydrophobicity corresponding to external environmental conditions due to the polymer of the water-soluble organic monomer (a) that forms a three-dimensional network structure. Consequently, a cell culture substrate comprising this organic/inorganic composite hydrogel is able to preferably culture cells and allow cultured cells to be detached and recovered both easily and rapidly without causing destruction of the cultured cells or separation and contamination by the substrate.

Although the inorganic/organic composite hydrogel used in the cell culture substrate of the present invention is obtained by polymerization of the water-soluble organic monomer (a) as a result of irradiating the water-soluble organic monomer (a) with radiation in the presence of the water-swellable clay mineral uniformly dispersed in water, polymerization by irradiation is ordinarily carried out using a polymerization initiator. At this time, the polymerization initiator is preferably uniformly dispersed, and is more preferably uniformly dispersed on the surface or in the vicinity thereof of the water-swellable clay mineral (b) uniformly dispersed in water. As a result of irradiating such an aqueous solution with radiation, an organic/inorganic composite hydrogel can be obtained in which the water-swellable clay mineral (b) is uniformly dispersed, thereby allowing the obtaining of a cell culture substrate having superior cell culturing performance. An example of a method for uniformly dispersing the polymerization initiator is described above.

There are no particular limitations on the cells capable of being cultured using the cell culture substrate of the present invention provided they are human or animal tissue cells, and examples of such cells include vascular cells, fibroblasts, muscle cells, nerve cells, chondrocytes, osteoblasts, liver cells, pancreas cells and cornea cells. Among these, vascular endothelial cells, skin fibroblasts, hepatic parenchymal cells, hepatic cancer cells and chondrocytes are used preferably. In particular, the present invention can be preferably used to culture, for example, skin fibroblasts, vascular endothelial cells and chondrocytes.

In addition to being used alone, the organic/inorganic composite hydrogel used in the cell culture substrate of the present invention is also used by coating onto a support having a smooth surface or irregular surface such as metal, ceramic, plastic, fabric, non-woven fabric, paper or wood. In addition, the composite hydrogel can be formed into various shapes to realize enhanced mechanical properties, and can be used in the form of a sheet, fibers, hollow fibers or spheres. The polymer hydrogel coated onto the support may be ultimately peeled from the support or may be used integrated with the support.

In the production of the cell culture substrate of the present invention, cell culture substrates having various sizes and shapes can be prepared by changing the shape of the polymerization vessel at the time of polymerization or cutting the gel after polymerization. For example, cell culture substrates can be prepared having an arbitrary shape such as fibers, rods, disks, cylinders, hollow shapes, spirals or spheres. In addition, the cell culture substrate can also be produced in the form of fine particles by using a method such as having a commonly used surfactant present during the polymerization reaction. In addition, the cell culture substrate of the present invention is preferably used by layering over a non-hydrophilic support such as a plastic or glass Petri dish routinely used for cell culturing. Such a laminated member may be polymerized on the support and used directly for cell culturing, or it may be polymerized in another vessel followed using for cell culturing after filling onto a substrate surface.

The organic/inorganic composite hydrogel used in the cell culture substrate of the present invention has the characteristic of being able to be formed at an arbitrary thickness when formed into various shapes, and when used by coating onto a support in particular, the thickness following irradiation is preferably 1000 μm or less and more preferably 10 to 500 μm for reasons such as ease of preparation, reduction of the amount of residual monomer following polymerization by irradiation, and ease of separation from the support.

A commonly known, ordinary organic crosslinking agent may also be used during production of the organic/inorganic composite hydrogel for the purpose of improving the properties thereof. There are no particular limitations on the organic crosslinking agent used, and can be selected according to the purpose of use. Examples of organic crosslinking agents that can be used include bifunctional compounds such as N,N'-methylene bisacrylamide, N,N'-propylene bisacrylamide, di(acrylamidomethyl)ether, 1,2-diacrylamidoethylene glycol, 1,3-diacryloyl ethylene urea, ethylene diacrylate, N,N'-diallyl tartar diamide and N,N'-bisacrylyl cystamine; and trifunctional compounds such as triallyl cyanurate or triallyl isocyanurate.

The cell culture substrate of the present invention can be obtained in the form of a dried cell culture substrate by forming the organic/inorganic composite hydrogel on a support and washing as necessary followed by drying while affixed to the support. In addition, a dried cell culture support can also be obtained by peeling the organic/inorganic composite hydrogel formed on the support from the support, washing as necessary and then drying.

A surface status suitable for cell culturing can be obtained for the cell culture substrate of the present invention by converting to a dry form. Moreover, when using as a cell culture substrate, by immersing the dried cell culture substrate in a liquid cell culture medium, the liquid culture medium can be absorbed by the cell culture substrate, thereby easily obtaining a cell culture substrate having a moisture content suitable for cell culturing. The water content at this time differs from the water content of the cell culture substrate prior to drying, and by changing the ratio of the polymer of the water-soluble organic monomer and the clay mineral in the organic/inorganic composite hydrogel that composes the cell culture substrate, and reversibly changing the hydrophilic and hydrophobic status of the organic/inorganic composite hydrogel, the water content can be arbitrarily controlled over a wide range. In particular, by immersing the organic/inorganic composite hydrogel in a medium at a higher temperature than the lower critical solution temperature of the organic/inorganic composite hydrogel, the water content thereof is controlled to a water content suitable for cell culturing, and that having a weight ratio of solvent to the dried cell culture substrate of 0.01 to 5 is used preferably, while that having a ratio of 0.01 to 1 is used more preferably. If the weight ratio is within this range, the surface of the organic/inorganic composite hydrogel in terms of smoothness, water content and so forth is suitable for cell culturing, and is able to demonstrate superior culturing characteristics for various types of cells.

Although it is necessary to sterilize the cell culture substrate prior to use for cell culturing, this sterilization step can be carried out with irradiation, autoclaving or gas sterilization and so forth of the organic/inorganic composite hydrogel. Among these, irradiation with gamma rays and so forth is used more preferably, and irradiation of a dried polymer hydrogel can be carried out particularly preferably. As a result, the cell culture substrate can be sterilized without significantly decreasing the properties of the organic/inorganic composite hydrogel and without allowing substances to remain that have a detrimental effect on cells.

When producing the organic/inorganic composite hydrogel, in addition to the water-soluble organic monomer, polymer or low molecular weight compounds can be contained as additives within a range that does not impair the effects of the present invention. Examples of such compounds that can be added include cell adhesion factors such as collagen and hyaluronic acid, cell growth factors and hydroxyapatite particles.

As has been described above, the cell culture substrate of the present invention is comprised of an organic/inorganic composite hydrogel having a three-dimensional network structure obtained by polymerizing the water-soluble organic monomer (a) in the presence of the water-swellable clay mineral (b) uniformly dispersed in water. Consequently, that in which the clay mineral is uniformly dispersed in the organic/inorganic composite hydrogel is obtained over a wide range of the clay mineral content, and since the organic/inorganic composite hydrogel can be controlled to a state that is suitable for cell adhesion and spreading, it has superior culturing performance. In addition, as a result of having superior flexibility and toughness, the shape of cultured cells can be retained even when transporting with the substrate, thereby making it possible to stably transport cultured cells. Moreover, in the case of, for example, co-culturing following initial cell culturing, culturing can be repeated without contamination by culture liquid or chemicals.

Since a cell culture substrate comprising a polymer hydrogel in which hydrophilicity and hydrophobicity change reversibly according to the external environment demonstrates superior adhesion with cells under hydrophobic conditions, cells can be suitably cultured and grown. In addition, since adhesion with cells can be decreased under hydrophilic conditions, cells can be detached without using a protein hydrolase such as trypsin or chemical agent, thereby enabling cells to be recovered easily without causing destruction of the cells or separation and contamination by the substrate. Moreover, since the change from hydrophobicity to hydrophilicity or from hydrophilicity to hydrophobicity occurs rapidly, the effect on cells is minimal when changes such as temperature are made to the external environment.

In particular, an organic/inorganic composite hydrogel coated film obtained by polymerizing the water-soluble organic monomer (a) with an energy beam is able to preferably demonstrate the superior properties described above even while in the form of a thin film.

[Antifogging Material]

The antifogging material of the present invention is comprised of a dried organic/inorganic composite hydrogel having a three-dimensional network structure composed of a polymer of the water-soluble organic monomer (a) and the water-swellable clay mineral (b), and can be easily produced according to the aforementioned production process. The antifogging material of the present invention is predicted to have extremely superior mechanical properties (surface hardness), transparency and antifogging performance due to electrostatic interaction, interaction of the hydrophobic portion, interaction by hydrogen bonds and coordinate bonds or a combination of interactions thereof between the polymer of the water-soluble organic monomer (a) and the water-swellable clay mineral (b).

The water-soluble organic monomer (a) and the water-swellable clay mineral (b) used here are the same as previously described, and a water-soluble acrylic monomer can be used particularly preferably for the water-soluble organic monomer (a) due to the ease of production by energy beam polymerization and the properties of the resulting gel.

In particular, acrylamide, methacrylamide or a derivative thereof (such as N- or N,N-substituted (meth)acrylamide) can be used preferably, while at least one type of monomer selected from the group consisting of the acrylic monomers represented by the aforementioned formulas (1) to (6) can be used more preferably. As a result of using these acrylic monomers, since the non-water-soluble polymerization initiator used during polymerization can be dispersed more finely and uniformly, an antifogging material having more superior properties can be obtained that is resistant to the effects of oxygen during polymerization by an energy beam.

In the antifogging material of the present invention, the thickness of the dried organic/inorganic composite hydrogel is preferably within the range of 1 to 500 µm, more preferably 1 to 100 µm and even more preferably 3 to 50 µm. Since a dried organic/inorganic composite hydrogel of this thickness allows facilitates the obtaining of a homogeneous film of adequate strength while also decreasing susceptibility to deformation of the gel during drying and peeling from the substrate, the surface layer of the antifogging material is able to demonstrate superior strength and surface antifogging performance.

In addition, since the dried organic/inorganic composite hydrogel can be easily layered on other substrates, antifogging performance can be preferably imparted to the substrate surface. In layering on another substrate, a coated film can be formed easily by carrying out energy beam polymerization on the other substrate.

The substrate used in the antifogging material of the present invention is preferably a transparent substrate from the viewpoint of maintaining antifogging performance, namely transparency. Examples of substrates include glass substrates such as glass or mirrored substrates, and transparent plastics such as polycarbonate or polyethylene.

The dried organic/inorganic composite hydrogel formed on the substrate can be in direct contact with the surface of the transparent substrate and integrated therewith, or the two can be integrated with a transparent primer layer or adhesive layer interposed there between. The adhesive layer is preferably a hydrophobic polymer comprising a polymer of a hydrophobic acrylic monomer in consideration of ease of production of the adhesive layer and the adhesive strength thereof.

The hydrophobic polymer is preferably a hydrophobic polymer comprising a hydrophobic acrylic monomer due to the superior adhesion thereof with the dried organic/inorganic composite hydrogel. Specific examples of hydrophobic acrylic monomers include acrylic acid esters and epoxy esters of acrylic acid having one or more acryloyl groups in a molecule thereof, and urethane oligomers having one or more acryloyl groups in a molecule thereof.

The antifogging material of the present invention can be prepared to have a wide range of hardness of the dried organic/inorganic composite hydrogel as is required in terms of wear resistance and so forth, and the surface hardness thereof preferably has a surface pencil hardness of HB or higher and particularly preferably H or higher from the viewpoint of ordinary handling ease.

The antifogging performance of the antifogging material of the present invention can be adjusted by suitably adjusting the degree of hydrophilicity (water contact angle) of the surface of the dried organic/inorganic composite hydrogel. The range for particularly preferable use as an antifogging material is preferably a water contact angle of 40° or less and more preferably 20° or less for the surface of the dried organic/inorganic composite hydrogel. The degree of hydrophilicity of the dried gel layer can be adjusted by suitably selecting a copolymer of the polymer of the water-soluble organic monomer (a) and another hydrophobic polymer.

Since the antifogging material of the present invention is a homogeneous film in which a clay mineral is uniformly dispersed in an organic polymer over a wide range of content of the clay mineral, it has superior mechanical properties (surface hardness), antifogging performance and transparency.

Moreover, since the dried organic/inorganic composite hydrogel has superior adhesion with the substrate, an antifogging material in which the dried organic/inorganic composite hydrogel and the hydrophobic polymer are covalently bonded in particular has extremely superior adhesion. In addition, since this antifogging material allows polymerization to be completed in an extremely short period of time while also being able to form a homogeneous film, it has the characteristic of having extremely high production efficiency, and is used in medical and nursing care devices as well as various types of industrial materials.

EXAMPLES

Although the following provides a more detailed explanation of the present invention through examples thereof, the scope of the present invention is not limited to these examples alone.

Example 1

Production of Organic/Inorganic Composite Hydrogel 2 g of N,N-dimethyl acrylamide (Kohjin Co., Ltd.) in the form of the water-soluble organic monomer (a), 0.8 g of Laponite XLG (Rockwood Additives Ltd.) in the form of the clay mineral (b) and 20 g of water in the form of the aqueous medium (c) were uniformly mixed to prepare a reaction solution (1).

98 g of polyoxypropylene monoacrylate ("Brenmer AP-400", NOF Corp.) in the form of the solvent (e) and 2 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (1).

50 µl of the solution (1) were added to the entire volume of the aforementioned reaction solution (1) and uniformly dispersed with an ultrasonic homogenizer followed by sealing in a glass tube having an inner diameter of 5.5 mm and irradiating with ultraviolet light having an ultraviolet intensity of 40 mW/cm$^2$ at 365 nm for 120 seconds to polymerize the N,N-dimethyl acrylamide and produce a rod-shaped organic/inorganic composite hydrogel (1).

When the gel produced in the manner described above was analyzed using a tensile tester (Model AGS-H, Shimadzu Corp.), the breaking point stress was found to be 60 KPa and the breaking point strain was found to be 1950%. The resulting gel was also visually determined to be colorless and transparent.

Example 2

Production of Organic/Inorganic Composite Hydrogel 2.3 g of N-isopropyl acrylamide (Kohjin Co., Ltd.) in the form of the water-soluble organic monomer (a), 0.8 g of Laponite XLG (Rockwood Additives Ltd.) in the form of the clay mineral (b) and 20 g of water in the form of the aqueous medium (c) were uniformly mixed to prepare a reaction solution (2).

95 g of 2-hydroxyethyl acrylate (Wako Pure Chemical Industries, Ltd.) in the form of the solvent (e) and 5 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (2).

100 μl of solution (2) were added to the entire volume of the aforementioned reaction solution (2) and uniformly dispersed with an ultrasonic homogenizer followed by sealing in a glass tube having an inner diameter of 5.5 mm and irradiating with ultraviolet rays having an ultraviolet intensity of 40 mW/cm$^2$ at 365 nm for 120 seconds to polymerize the N-isopropyl acrylamide and produce a rod-shaped organic/inorganic composite hydrogel (2).

When the gel produced in the manner described above was analyzed using a tensile tester (Model AGS-H, Shimadzu Corp.), the breaking point stress was found to be 125 KPa and the breaking point strain was found to be 1200%. The resulting gel was also visually determined to be colorless and transparent.

When this gel was immersed for 165 hours in water at 20° C., the gel swelled to about 400% of its initial mass. In addition, when this swollen gel was immersed for 24 hours in water at 50° C., the gel de-swelled and returned to about 35% of its initial mass.

Example 3

Production of Organic/Inorganic Composite Hydrogel 2.6 g of 2-methoxyethyl acrylate (Wako Pure Chemical Industries, Ltd.) in the form of the water-soluble organic monomer (a), 1.6 g of Laponite XLG (Rockwood Additives Ltd.) in the form of the clay mineral (b) and 20 g of water in the form of the aqueous medium (c) were uniformly mixed to prepare a reaction solution (3).

95 g of N,N-dimethylacetoamide (Wako Pure Chemical Industries, Ltd.) in the form of the solvent (e) and 5 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (3).

80 μl of the solution (3) were added to the entire volume of the aforementioned reaction solution (3) and uniformly dispersed with an ultrasonic homogenizer followed by coating onto a glass plate to a thickness of 150 μm using a bar coater and irradiating with ultraviolet rays having an ultraviolet intensity of 40 mW/cm$^2$ at 365 nm for 120 seconds to polymerize the 2-methoxyethyl acrylate and produce a coated film of an organic/inorganic composite hydrogel (3). The resulting gel was visually observed to be colorless and transparent.

Example 4

Production of Organic/Inorganic Composite Hydrogel 2.8 g of 4-acryloylmorpholine (Wako Pure Chemical Industries, Ltd.) in the form of the water-soluble organic monomer (a), 1.6 g of Laponite XLG (Rockwood Additives Ltd.) in the form of the clay mineral (b) and 20 g of water in the form of the aqueous medium (c) were uniformly mixed to prepare a reaction solution (4).

92 g of polyoxypropylene monoacrylate ("Brenmer AP-400", NOF Corp.) in the form of the solvent (e) and 8 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (4).

80 μl of the solution (4) were added to the entire volume of the aforementioned reaction solution (4) and the solution was uniformly dispersed with an ultrasonic homogenizer followed by coating onto a glass plate to a thickness of 200 μm using a bar coater, irradiating with ultraviolet rays having an ultraviolet intensity of 40 mW/cm$^2$ at 365 nm for 120 seconds through a polyethylene terephthalate (PET) mask (line width: approx. 200 μm, having black lines drawn to roughly 5 cm in length) to polymerize the 4-acryloylmorpholine and removing the uncured (black line) portion by rinsing with water to produce a coated film of an organic/inorganic composite hydrogel (4) having grooves in the pattern as the black lines of the mask.

The gel produced in the manner described above was visually observed to be colorless and transparent.

In addition, observation of the grooves with a light microscope revealed the groove width to be about 200 μm.

Comparative Example 1

2 g of N,N-dimethyl acrylamide (Kohjin Ltd.) in the form of a water-soluble organic monomer, 0.8 g of Laponite XLG (Rockwood Additives Ltd.) in the form of a clay mineral, 0.02 g of potassium peroxodisulfate (Wako Pure Chemical Industries, Ltd.) in the form of a water-soluble polymerization initiator (peroxide) and 20 g of water in the form of an aqueous medium were uniformly mixed in air isolated from oxygen to prepare a reaction solution (1').

The aforementioned reaction solution (1') was sealed in a glass tube having an inner diameter of 5.5 mm in air not isolated from oxygen and allowed to stand undisturbed for 15 hours in a water bath at 20° C. However, since all of the aforementioned procedures were not isolated from oxygen, the solution only became slightly viscous and a gel was not obtained.

Comparative Example 2

2.3 g of N-isopropyl acrylamide (Kohjin Ltd.) in the form of a water-soluble organic monomer, 0.8 g of Laponite XLG (Rockwood Additives Ltd.) in the form of a clay mineral, 0.2 g of 2-hydroxy-1-[4-(2-hydroxyethoxy)phenyl]-1-propane ("Irgacure 2959", Ciba Specialty Chemicals Ltd.) in the form of a water-soluble polymerization initiator and 20 g of water in the form of an aqueous medium were uniformly mixed in air isolated from oxygen to prepare a reaction solution (2').

The aforementioned reaction solution (2') was sealed in a glass tube having an inner diameter of 5.5 mm and polymerized by irradiating with ultraviolet light having an ultraviolet intensity of 40 mW/cm$^2$ at 365 nm for 120 seconds. The resulting gel was visually observed to have a milky white color and be opaque. Although the gel was attempted to be analyzed using a tensile tester (Model AGS-H, Shimadzu Corp.), testing was unable to be carried out due to the excessively weak strength of the gel.

On the basis of the results of the aforementioned Examples 1 to 4 and Comparative Examples 1 and 2, according to the production process of the present invention, an organic/inorganic composite hydrogel that demonstrates superior mechanical properties, flexibility and transparency was clearly determined to be able to be produced in extremely short period of time, without having to remove oxygen, and over a wide range of a clay mineral content, by uniformly dispersing the clay mineral in an organic polymer.

Example 5

Production of Cell Culture Substrate 2.23 g of N-isopropyl acrylamide (Kohjin Ltd.) in the form of the water-soluble organic monomer (a), 0.8 g of Laponite XLG (Rockwood Additives Ltd.) in the form of the clay mineral (b) and 20 g of water in the form of the aqueous medium (c) were uniformly mixed to prepare a reaction solution (5).

98 g of polyoxypropylene monoacrylate ("Brenmer AP-400", NOF Corp.) in the form of the solvent (e) and 2 g of 1-hydroxycyclohexyl phenyl ketone ("Irgacure 184", Ciba Specialty Chemicals Ltd.) in the form of the non-water-soluble polymerization initiator (d) were uniformly mixed to product a solution (5).

50 μl of the solution (5) were added to the entire volume of the aforementioned reaction solution (5) and uniformly dispersed with an ultrasonic homogenizer followed by coating that solution onto a polyethylene terephthalate (PET) film to a thickness of 200 μm using a bar coater and irradiating with ultraviolet rays having an ultraviolet intensity of 40 mW/cm$^2$ at 365 nm for 120 seconds to polymerize the water-soluble organic monomer and obtain a sheet-like organic/inorganic composite hydrogel (5).

After the resulting sheet-like organic/inorganic composite hydrogel (5) was slightly immersed in water at 20° C. and allowed to swell to adjust to a water content of 90%, the sheet-like organic/inorganic composite hydrogel (5) was peeled from the PET film so as not to damage the gel. The peeled sheet-like organic/inorganic composite hydrogel was then cut to a size of 1 cm×5 cm and attached to a tensile tester ("Benchtop Universal Tester AGS-H", Shimadzu Corp.) so as not to slide in the chuck. As a result of then carrying out tensile testing at a distance between evaluation points of 30 mm and pulling speed of 100 mm/min, the tensile fracture strength was found to be 95 kPa and the braking elongation was found to be 1010%. After carefully wiping off all water adhered to the surface of this sheet-like organic/inorganic composite hydrogel (5), the contact angles of the surface of the sheet-like organic/inorganic composite hydrogel (5) relative to water were measured at 20° C. and 50° C. using a contact angle measuring apparatus ("CA-X200", Kyowa Interface Science Co., Ltd.). The water contact angle at 20° C. was 300 and the water contact angle at 50° C. was 600. On the basis of these results, the resulting sheet-like organic/inorganic composite hydrogel was confirmed to demonstrate both hydrophilicity and hydrophobicity according to temperature conditions.

On the other hand, the sheet-like organic/inorganic composite hydrogel (5) was then immersed for 2 days in 2 liters of ultrapure water at 20° C., removed after the hydrogel was allowed to swell, immersed again for 2 days in 1 liter of ultrapure water at 50° C. and then removed after the hydrogel was allowed to de-swell. After repeating this washing purification procedure 3 times, the purified sheet-like organic/inorganic composite hydrogel (5) was cut to a diameter of 8 cm to obtain a cell culture substrate (A). This was then transferred to a cell culture dish ("Falcon 3003", Becton-Dickinson Labware Inc.), covered and allowed to stand undisturbed at 37° C. Furthermore, all procedures from purification to transfer of the cell culture substrate (A) to the cell culture dish were carried out in a Clean Bench.

[Culturing Test]

Cells were cultured using the cell culture dish containing the cell culture substrate (A) obtained in the manner described above. Cancer cell line cells HepG2 derived from human liver epithelial cells (Dainippon Sumitomo Pharma Co., Ltd.) were used for the cultured cells. Culturing was carried out using minimum essential Eagle's medium (Sigma) containing 10% fetal calf serum (ICN) (containing as additives pyruvic acid (ICN) and non-essential amino acids (ICN)) in a 37° C. incubator containing 5% carbon dioxide. In addition, two dishes containing the cell culture substrate (A) were prepared, and simultaneously inoculated under the same conditions. One week after inoculation, one of the dishes containing the cell culture substrate (A) was allowed to stand undisturbed for 5 minutes in a 20° C. constant temperature chamber followed by observing the surface thereof with a light microscope to confirm that the cells had adhered to the cell culture substrate (A) and grown sufficiently. The cell culture substrate (A) together with the cultured cells were removed from the dish containing the other cell culture substrate (A) used for culturing, and transferred to a tissue culture dish containing minimum essential Eagle's medium containing 10% fetal calf serum pre-warmed to a temperature of 20° C. After covering and allowing to stand undisturbed for 10 minutes at 20° C., the cells were able to be detached from the cell culture substrate (A) by grabbing the cells that had grown on the cell culture substrate (A) with a tweezers. At this time, there was no damage to the cell culture substrate (A), and the cell culture substrate (A) was not observed to be adhered to the detached cells. After separating into individual cells by treating the detached cells with trypsin-EDTA, a count of viable cells as determined by Trypan blue staining confirmed that the $2.0 \times 10^6$ cells at the start of culturing had increased to $1.9 \times 10^8$ cells after culturing.

Example 6

Culturing Test

Cells were cultured using the cell culture dish containing the cell culture substrate (A) obtained in the aforementioned Example 5. Normal human skin fibroblasts (Dainippon Sumitomo Pharma Co., Ltd.) were used for the cultured cells. Culturing was carried out using CS—C medium (Dainippon Sumitomo Pharma Co., Ltd.) in a 37° C. incubator containing 5% carbon dioxide. In addition, two dishes containing the cell culture substrate (A) were prepared, and simultaneously inoculated under the same conditions. One week after inoculation, one of the dishes containing the cell culture substrate (A) was allowed to stand undisturbed for 5 minutes in a 20° C. constant temperature chamber followed by observing the surface thereof with a light microscope to confirm that the cells had adhered to the cell culture substrate (A) and grown sufficiently. The cell culture substrate (A) together with the cultured cells were removed from the dish containing the other cell culture substrate (A) used for culturing, and transferred to a tissue culture dish containing CS—C medium pre-warmed to a temperature of 20° C. After covering and allowing to stand undisturbed for 10 minutes at 20° C., the cells were able to be detached from the cell culture substrate (A) in the form of a sheet by grabbing the cells that had grown on the cell culture substrate (A) with a tweezers. At this time, there was no damage to the cell culture substrate (A), and the cell culture substrate (A) was not observed to be adhered to the sheet-like cells. After separating into individual cells by treating the removed sheet-like cells with trypsin-EDTA, a count of viable cells as determined by Trypan blue staining confirmed that the $2.5 \times 10^6$ cells at the start of culturing had increased to $9.1 \times 10^7$ cells after culturing.

Example 7

Production of Cell Culture Substrate

A nearly colorless and transparent, homogeneous sheet-like organic/inorganic composite hydrogel (6) was synthesized in the same manner as Example 5 with the exception of changing the amount of Laponite XLG added to 1.6 g. When the contact angle with respect to water at 20° C. and 50° C. was measured in the same manner as Example 1 using the resulting sheet-like organic/inorganic composite hydrogel (6), the water contact angle at 20° C. was found to be 29° and that at 50° C. was found to be 45°, thus confirming that the resulting sheet-like organic/inorganic composite hydrogel (6) exhibits both hydrophilicity and hydrophobicity according to temperature conditions. The resulting sheet-like organic/inorganic composite hydrogel (6) was then immersed for 2 days in 1 liter of ultrapure water at 20° C. and removed after the hydrogel was allowed to swell, followed by immersing for 2 days in 1 liter of ultrapure water at 50° C. and removed after the hydrogel was allowed to de-swell. After repeating this washing purification procedure 3 times, the edges of the purified sheet-like organic/inorganic composite hydrogel (6) were immobilized with clips so as not to deform the four sides thereof and allowed to dry for 3 days inside a Clean Bench. The resulting dried hydrogel was placed in a gas-impermeable plastic bag and sealed and irradiated with gamma rays (radiation source: Cobalt 60, Radia Industry Co., Ltd.). The radiation dose was 25 kGy. There was no particular deformation or discoloration observed in the dried hydrogel following irradiation. Following irradiation with gamma rays, the dried hydrogel was cut to a diameter of 8 cm to obtain a cell culture substrate (B) comprised of the dried sheet-like organic/inorganic composite hydrogel (6).

[Culturing Test]

HepG2 cells were cultured using the cell culture substrate (B) obtained in this manner using the same cells, media and culturing conditions and in the same manner as Example 1. When the surface was observed with a light microscope using the same method as Example 1 one week after inoculation of the cells, the cells were confirmed to be adhered and adequately growing on the cell culture substrate (B). After culturing the cells using another dish containing the cell culture substrate (B) in the same manner as Example 1, the cell culture substrate (B) together with the cultured cells were removed from the dish containing the cell culture substrate (B), and transferred to a tissue culture dish containing minimum essential Eagle's medium containing 10% fetal calf serum pre-warmed to a temperature of 20° C. After covering and allowing to stand undisturbed for 10 minutes at 20° C., the cells were able to be detached from the cell culture substrate (B) by grabbing the cells that had grown on the cell culture substrate (B) with a tweezers. At this time, there was no damage to the cell culture substrate (B), and the cell culture substrate (B) was not observed to be adhered to the detached cells. A count of viable cells carried out in the same manner as Example 1 confirmed that the $2.0 \times 10^6$ cells at the start of culturing had increased to $1.3 \times 10^7$ cells after culturing.

In addition, when the hydrogel was dried and the resulting dried hydrogel was immersed in the media used in the experiment described above followed by holding for 24 hours in a 37° C. incubator, the hydrogel returned to a hydrogel having a moisture content of 30%.

Comparative Example 3

Cells were cultured using a cell culture dish ("Falcon 3003" not subjected to any surface treatment. Culturing was carried out using the same cells, media and culturing conditions and in the same manner as Example 1. When the surface of the dish was observed with a light microscope one week after the start of culturing, the cells were confirmed to be adhered and growing. After the dish used for this culturing was placed in an incubator at 20° C. and allowed to stand undisturbed for 10 minutes, although the cells were attempted to be removed from the dish, there was no detachment of the cells whatsoever. In addition, when the cultured cells were detached using trypsin in accordance with known methods, the cells ended up breaking up into individual cells and were unable to be removed in the form of a sheet.

Comparative Example 4

An organic crosslinked hydrogel was polymerized in the same manner as Example 1 with the exception of not using a clay mineral and adding an organic crosslinking agent after adding NIPA monomer at 5 mol % of the monomer. N,N'-methylene bisacrylamide (Wako Pure Chemical Industries, Ltd.) was used as is for the organic crosslinking agent. As a result, a sheet-like hydrogel was obtained that became white at 20° C. Although the resulting sheet-like hydrogel was transferred to a cell culture dish after purifying in the same manner as Example 1, since the hydrogel was extremely brittle, purification and transfer were difficult In addition, the contact angle of this sheet-like hydrogel was 49° when held at a temperature of 50° C.

Next, cells were cultured in the same manner as Example 2 using the cell culture dish containing this sheet-like hydrogel. When a portion of the sheet-like hydrogel in the dish was removed one week after the start of culturing and stained with Trypan blue, the cells were not confirmed to be growing on the sheet-like hydrogel. In addition, although this sheet-like hydrogel was attempted to be removed from the dish, the sheet-like hydrogel ended up breaking and was unable to be removed.

As shown in the aforementioned Examples 5 to 7, due to its flexibility and toughness, the cell culture substrate of the present invention enabled cells to be recovered without damaging the cells and without allowing the cells to be contaminated by the substrate during separation and recovery of cultured cells. Moreover, since the hydrophilicity and hydrophobicity of the cell culture substrate reversibly change according to the external environment, the cultured cells were able to be recovered rapidly. On the other hand, as shown in Comparative Example 3, cell culture substrates of the prior art resulted in severing of bonds between the cells and substrate during cell recovery, while also causing bonds between cells to be severed, thereby preventing the cells from being removed in a proliferating state. Moreover, in Comparative Example 4, the shape of the culture substrate was unable to be maintained.

Example 8

Production of Antifogging Coated Film 2 g of N,N-dimethyl acrylamide (Kohjin Co., Ltd.) in the form of the water-soluble organic monomer (a), 0.8 g of Laponite XLG (Rockwood Additives Ltd.) in the form of the clay mineral (b) and 20 g of water in the form of the aqueous medium (c) were uniformly mixed to prepare a reaction solution (7).

98 g of polyoxypropylene monoacrylate ("Brenmer AP-400", NOF Corp.) in the form of the solvent (e) and 2 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (7).

50 µl of the solution (7) were added to the entire volume of the aforementioned reaction solution (7) and uniformly dispersed with an ultrasonic homogenizer followed by coating onto a 3 mm thick glass plate to a thickness of 150 µm using a bar coater and irradiating with ultraviolet rays having an ultraviolet intensity of 40 mW/cm$^2$ at 365 nm for 120 seconds to polymerize the N,N-dimethyl acrylamide and produce an organic/inorganic composite hydrogel (7) on the glass plate.

The aforementioned organic/inorganic composite hydrogel (7) was dried for 20 minutes with a hot air dryer at 80° C. to produce an antifogging coated film (X) laminated on the glass plate.

The antifogging coated film (X) produced in the manner described above was visually determined to be colorless and transparent. The surface hardness on the dried gel side of the antifogging coated film (X) as measured using the pencil method was H. The water contact angle as measured using a contact angle measuring apparatus ("CA-X200", Kyowa Interface Science Co., Ltd.) was 31°.

[Antifogging Performance Test]

The antifogging coated film (X) prepared in the manner described above was placed over a 200 ml beaker containing 100 ml of hot water at 60° C. so that the dried gel was facing downward and the film was confirmed not to fog for 1 minute. The dried gel did not swell and did not separate from the glass after testing.

Example 9

Production of Antifogging Coated Film 2.3 g of N-isopropyl acrylamide (Kohjin Co., Ltd.) in the form of the water-soluble organic monomer (a), 1.28 g of Laponite XLG (Rockwood Additives Ltd.) in the form of the clay mineral (b) and 20 g of water in the form of the aqueous medium (c) were uniformly mixed to prepare a reaction solution (8).

95 g of 2-hydroxyethyl acrylate (Wako Pure Chemical Industries, Ltd.) in the form of the solvent (e) and 5 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (8).

100 µl of the solution (8) were added to the entire volume of the aforementioned reaction solution (8) and uniformly dispersed with an ultrasonic homogenizer followed by coating onto a polycarbonate plate (thickness: 3 mm) pre-coated with an adhesive layer in the form of hydrophobic urethane acrylate (V-4263, Dainippon Ink & Chemicals Inc.) containing 2% by weight of 1-hydroxycyclohexyl phenyl ketone to a thickness of 20 µm, and irradiating with ultraviolet rays having an ultraviolet intensity of 40 mW/cm$^2$ at 365 nm for 120 seconds to polymerize the adhesive layer and the N-isopropyl acrylamide and produce an organic/inorganic composite hydrogel (8) on a substrate having an adhesive layer.

The aforementioned organic/inorganic composite hydrogel (8) was dried for 20 minutes with a hot air dryer at 80° C. to produce an antifogging coated film (Y).

The antifogging coated film (Y) produced in the manner described above was visually determined to be colorless and transparent. The surface hardness on the dried gel side of the substrate as measured using the pencil method was H. The water contact angle as measured using a contact angle measuring apparatus ("CA-X200", Kyowa Interface Science Co., Ltd.) was 30°.

[Antifogging Performance Test]

The antifogging coated film (Y) prepared in the manner described above was placed over a 200 ml beaker containing 100 ml of hot water at 60° C. so that the dried gel was facing downward and the film was confirmed not to fog for 1 minute. The dried gel did not swell and did not separate from the polycarbonate plate after testing.

Example 10

Production of Antifogging Coated Film 2.8 g of acryloyl morpholine (Kohjin Co., Ltd.) in the form of the water-soluble organic monomer (a), 1.6 g of Laponite XLG (Rockwood Additives Ltd.) in the form of the clay mineral (b) and 20 g of water in the form of the aqueous medium (c) were uniformly mixed to prepare a reaction solution (9).

95 g of N,N-dimethylacetoamide (Wako Pure Chemical Industries, Ltd.) in the form of the solvent (e) and 5 g of 1-hydroxycyclohexyl phenyl ketone ("Irgacure 184", Ciba Specialty Chemicals Ltd.) in the form of the non-water-soluble polymerization initiator (d) were uniformly mixed to prepare solution (9).

80 µl of the solution (9) were added to the entire volume of the aforementioned reaction solution (9) and uniformly dispersed with a mixer followed by coating that solution onto a 200 µm thick polyethylene terephthalate (PET) sheet to a thickness of 150 µm using a bar coater and irradiating with ultraviolet rays having an ultraviolet intensity of 40 mW/cm$^2$ at 365 nm for 120 seconds to polymerize the acryloyl morpholine and produce an organic/inorganic composite hydrogel (9) on a PET substrate.

The aforementioned organic/inorganic composite hydrogel (9) was dried for 20 minutes with a hot air dryer at 80° C. to produce an antifogging coated film (Z).

The antifogging coated film (Z) produced in the manner described above was visually determined to be colorless and transparent. The surface hardness on the dried gel side of the substrate as measured using the pencil method was 2H. The water contact angle as measured using a contact angle measuring apparatus ("CA-X200", Kyowa Interface Science Co., Ltd.) was 33°.

[Antifogging Performance Test]

The antifogging coated film (Z) prepared in the manner described above was placed over a 200 ml beaker containing 100 ml of hot water at 60° C. so that the dried gel was facing downward and the film was confirmed not to fog for 1 minute. The dried gel did not swell and did not separate from the polycarbonate plate after testing.

Comparative Example 5

4.5 g of methyl methacrylate (Wako Pure Chemical Industries, Ltd.), 3.5 g of butyl methacrylate (Wako Pure Chemical Industries, Ltd.), 1 g of hydroxyethyl methacrylate (Kyoeisha Chemical Co., Ltd.), 0.3 g of acrylic acid (Wako Pure Chemical Industries, Ltd.) 0.2 g of methacrylic acid (Wako Pure Chemical Industries, Ltd.) and 10 g of 2-propanol (Wako Pure Chemical Industries, Ltd.) were uniformly mixed to prepare an acrylic monomer composition.

0.4 g of Laponite XLG (Rockwood Additives Ltd.) in the form of the clay mineral (B) were dispersed in a mixed solution of 4.8 g of 2-propanol (Wako Pure Chemical Industries, Ltd.) and 4.8 g of water to prepare a clay mineral dispersion.

0.2 g of the acrylic monomer composition prepared in the manner described above, 5 g of the clay mineral dispersion, 20 g of 2-propanol and 30 g of water were uniformly mixed to prepare an antifogging composition 1.

The aforementioned antifogging composition 1 was then coated onto a glass plate using a bar coater having a coated film thickness of 10 μm followed by drying by heating for 10 minutes in a hot air dryer at 90° C. to produce an antifogging coated film.

The antifogging coated film produced in the manner described above was visually determined to be white and foggy. This was due to the clay not having dissolved in the mixture of water and 2-propanol. The surface hardness of the antifogging coated film as measured with the pencil method was B. The water contact angle as measured using a contact angle measuring apparatus ("CA-X200", Kyowa Interface Science Co., Ltd.) was 32°.

When the antifogging coated film prepared in the manner described above was placed over a 200 ml beaker containing 100 ml of hot water at 60° C. so that the coated film was facing downward and allowed to stand undisturbed for 1 minute, fogging was observed on the side of the dried gel layer.

As indicated in Examples 8 to 10, the antifogging coated film comprising a dried organic/inorganic composite hydrogel having a three-dimensional network structure composed of a polymer of a water-soluble organic monomer and a water-swellable clay mineral of the present invention demonstrated superior antifogging performance, high mechanical properties and heat resistance, superior adhesion with a substrate and demonstrated superior transparency. On the other hand, the antifogging coated film indicated in Comparative Example 5, comprising a dried gel not having a three-dimensional network structure composed of a polymer of a water-soluble organic monomer and water-swellable clay mineral, demonstrated inferior transparency and antifogging performance.

INDUSTRIAL APPLICABILITY

Since the production process of the present invention eliminates the need for a step for removing oxygen, it enables an organic/inorganic composite hydrogel to be easily produced, and since the hydrogel can be produced in an extremely short period of time by irradiating with an energy beam, an organic/inorganic composite hydrogel can be advantageously obtained in terms of production equipment and cost.

In addition, since the organic/inorganic composite hydrogel coated film, dried coated film and antifogging coated film of the present invention demonstrate superior mechanical properties, flexibility and so forth as a result of a clay mineral being uniformly dispersed in an organic polymer, they are useful as materials for medical and nursing care devices as well as various types of industrial materials. In particular, since a cell culture substrate composed of the organic/inorganic composite hydrogel of the present invention has superior flexibility and toughness while also being able to rapidly respond to changes in the external environment, it has considerable industrial significance since cells can be recovered easily without having an effect on the cells.

The invention claimed is:

1. A production process of an organic/inorganic composite hydrogel, comprising:
dispersing a non-water-soluble polymerization initiator (d) in an aqueous medium (c) to form a dispersion, and then
adding a water-soluble organic monomer (a) and a water-swellable clay mineral (b) to said dispersion, and
reacting the water-soluble organic monomer (a) and the water-swellable clay mineral (b) by irradiating with an energy beam, thereby producing said organic/inorganic composite hydrogel,
wherein said organic/inorganic composite hydrogel has a three-dimensional network structure including a polymer of said water-soluble organic monomer (a) and said water-swellable clay mineral (b),
wherein said non-water soluble polymerization initiator (d) is dissolved in a solvent (e) to prepare a solution and the solution is dispersed into the aqueous medium (c), and
wherein the solvent (e) is an acrylic monomer (e1) that dissolves the non-water-soluble polymerization initiator (d) and has an HLB value of 8 or more.

2. The production process of an organic/inorganic composite hydrogel according to claim 1, wherein weight ratio (d)/(e) of the non-water-soluble polymerization initiator (d) to the solvent (e) in the solution in which the polymerization initiator (d) is dissolved in the solvent (e) is within the range of 0.001 to 0.1.

3. The production process of an organic/inorganic composite hydrogel according to claim 1, wherein a dispersed amount of the solution in which the non-water-soluble polymerization initiator (d) is dissolved in the solvent (e) is 5% by weight or less based on the total weight of the water-soluble organic monomer (a), the water-swellable clay mineral (b), the aqueous medium (c), the polymerization initiator (d) and the solvent (e).

4. The production process of an organic/inorganic composite hydrogel according to claim 1, wherein the water-soluble organic monomer (a) is a water-soluble acrylic monomer.

5. The production process of an organic/inorganic composite hydrogel according to claim 1, wherein the water-soluble organic monomer (a) is at least one type selected from the group consisting of N-substituted acrylamide derivatives, N,N-disubstituted acrylamide derivatives, N-substituted methacrylamide derivatives and N,N-disubstituted methacrylamide derivatives.

6. The production process of an organic/inorganic composite hydrogel according to claim 1, wherein after adding the water-soluble organic monomer (a) and the water-swellable clay mineral (b) to said dispersion, the clay mineral (b) separates into 1 to 10 layers in the dispersion.

7. The production process of an organic/inorganic composite hydrogel according to claim 1, wherein the water-swellable clay mineral (b) is at least one type selected from the group consisting of water-swellable hectorite, water-swellable montmorillonite, water-swellable saponite and water-swellable synthetic mica.

8. The production process of an organic/inorganic composite hydrogel according to claim 1, wherein the weight ratio (b)/(a) of the water-swellable clay mineral (b) to the water-soluble organic monomer (a) in the dispersion, after addition of the water-swellable clay mineral (b) and the water-soluble organic monomer (a), is within the range of 0.01 to 10.

9. The production process of an organic/inorganic composite hydrogel according to claim 1, wherein the irradiation with an energy beam is irradiation with an energy beam through a mask having a pattern, said mask being disposed between an energy source of said energy beam and said dispersion with said water-swellable clay mineral (b) and the water-soluble organic monomer added.

10. The production process of an organic/inorganic composite hydrogel according to claim 1, wherein the dispersing and adding steps are carried out in an air atmosphere.

11. A production process of a dried organic/inorganic composite hydrogel, comprising:
   removing the solvent (e) from an organic/inorganic composite hydrogel obtained according to the production process of an organic/inorganic composite hydrogel according to claim 1.

12. A production process of a dried film coated with an organic/inorganic composite hydrogel, comprising:
   providing a film;
   coating said film with an energy beam-curable composition (X), containing a dispersion of a non-water-soluble polymerization initiator (d), a water-soluble organic monomer (a), a water-swellable clay mineral (b), an aqueous medium (c), and a solvent (e), thereby producing a coated substrate;
   irradiating the coated substrate with an energy beam, and
   removing the solvent (e) from the coated substrate, thereby forming said dried film coated with said organic/inorganic composite hydrogel,
   wherein said organic/inorganic composite hydrogel has a three-dimensional network structure including a polymer of said water-soluble organic monomer (a) and said water-swellable clay mineral (b),
   wherein said non-water soluble polymerization initiator (d) is dissolved in a solvent (e) to prepare a solution and the solution is dispersed into the aqueous medium (c), and
   wherein the solvent (e) is an acrylic monomer (e1) that dissolves the non-water-soluble polymerization initiator (d) and has an HLB value of 8 or more.

* * * * *